(12) United States Patent
Arrowood et al.

(10) Patent No.: US 8,959,226 B2
(45) Date of Patent: *Feb. 17, 2015

(54) LOAD BALANCING WORKLOAD GROUPS

(75) Inventors: Andrew H. Arrowood, Raleigh, NC (US); Michael G. Fitzpatrick, Raleigh, NC (US); Gary O. McAfee, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 116 days.

This patent is subject to a terminal disclaimer.

(21) Appl. No.: 13/447,884

(22) Filed: Apr. 16, 2012

(65) Prior Publication Data

US 2012/0297068 A1   Nov. 22, 2012

Related U.S. Application Data

(63) Continuation of application No. 13/111,329, filed on May 19, 2011.

(51) Int. Cl.
*G06F 15/173* (2006.01)
*H04L 29/08* (2006.01)

(52) U.S. Cl.
CPC ................... *H04L 67/1002* (2013.01)
USPC ........... 709/226; 709/223; 709/224; 709/225; 370/398; 370/412; 718/104

(58) Field of Classification Search
CPC ............ H04L 67/1002; H04L 12/5689; H04L 67/322; G06F 15/173
USPC ..................... 709/226; 370/398, 412; 718/104
See application file for complete search history.

(56) References Cited

U.S. PATENT DOCUMENTS

| | | |
|---|---|---|
| 6,185,619 B1 | 2/2001 | Joffe et al. |
| 6,742,023 B1 | 5/2004 | Fanning et al. |
| 7,069,267 B2 | 6/2006 | Spencer, Jr. |
| 7,296,268 B2 | 11/2007 | Darling et al. |
| 7,630,860 B1 | 12/2009 | Donnelly et al. |
| 7,647,405 B2 * | 1/2010 | Bivens et al. .................. 709/226 |
| 7,712,102 B2 * | 5/2010 | Herington et al. ............. 718/105 |
| 7,882,501 B1 * | 2/2011 | Carlson et al. ................. 717/167 |
| 7,962,635 B2 | 6/2011 | Naidu et al. |
| 8,015,301 B2 * | 9/2011 | Carter et al. .................. 709/229 |
| 8,296,434 B1 * | 10/2012 | Miller et al. .................. 709/226 |
| 2002/0013838 A1 | 1/2002 | Kushida et al. |
| 2002/0120787 A1 | 8/2002 | Sharpiro et al. |
| 2002/0152305 A1 * | 10/2002 | Jackson et al. ................ 709/224 |
| 2002/0188610 A1 | 12/2002 | Spencer, Jr. |
| 2002/0194335 A1 | 12/2002 | Maynard |
| 2003/0046396 A1 * | 3/2003 | Richter et al. ................ 709/226 |

(Continued)

OTHER PUBLICATIONS

Final Office Action, dated Sep. 19, 2013, regarding U.S. Appl. No. 13/111,329, 12 pages.

*Primary Examiner* — Razu Miah
(74) *Attorney, Agent, or Firm* — Yee & Associates; Parashos T. Kalaitzis

(57) ABSTRACT

A method for managing requests. The requests are received by a workload manager system to perform operations on data. A set of server applications is identified by the workload manager system to perform the operations in the requests based on a set of common resources used by the set of server applications. The set of server applications is in a workload group and the workload group is comprised of a plurality of application groups.

7 Claims, 7 Drawing Sheets

(56) References Cited

U.S. PATENT DOCUMENTS

| | | | |
|---|---|---|---|
| 2003/0061362 A1 | 3/2003 | Qui et al. | |
| 2003/0158940 A1* | 8/2003 | Leigh | 709/226 |
| 2003/0172163 A1* | 9/2003 | Fujita et al. | 709/226 |
| 2004/0103194 A1* | 5/2004 | Islam et al. | 709/225 |
| 2004/0122950 A1 | 6/2004 | Morgan et al. | |
| 2004/0162901 A1* | 8/2004 | Mangipudi et al. | 709/225 |
| 2005/0027862 A1 | 2/2005 | Nguyen et al. | |
| 2005/0149940 A1* | 7/2005 | Calinescu et al. | 718/104 |
| 2005/0165925 A1* | 7/2005 | Dan et al. | 709/224 |
| 2005/0188075 A1* | 8/2005 | Dias et al. | 709/224 |
| 2006/0168337 A1* | 7/2006 | Stahl et al. | 709/240 |
| 2006/0212334 A1* | 9/2006 | Jackson | 705/8 |
| 2007/0124476 A1* | 5/2007 | Oesterreicher et al. | 709/226 |
| 2007/0130341 A1* | 6/2007 | Ma | 709/226 |
| 2007/0162912 A1* | 7/2007 | Kilian | 719/313 |
| 2007/0204030 A1* | 8/2007 | Mimura et al. | 709/223 |
| 2007/0233809 A1* | 10/2007 | Brownell et al. | 709/218 |
| 2007/0294387 A1* | 12/2007 | Martin | 709/224 |
| 2008/0016214 A1* | 1/2008 | Galluzzo et al. | 709/226 |
| 2008/0059633 A1* | 3/2008 | Hu | 709/225 |
| 2008/0072311 A1* | 3/2008 | Mullick et al. | 726/15 |
| 2008/0189418 A1* | 8/2008 | Kimbrel et al. | 709/226 |
| 2008/0205402 A1* | 8/2008 | McGee et al. | 370/392 |
| 2008/0209428 A1* | 8/2008 | Baryshnikov et al. | 718/104 |
| 2008/0263206 A1* | 10/2008 | Bivens et al. | 709/226 |
| 2008/0285578 A1* | 11/2008 | DeLay et al. | 370/412 |
| 2009/0183016 A1* | 7/2009 | Chan et al. | 713/323 |
| 2009/0276842 A1 | 11/2009 | Yevmenkin et al. | |
| 2009/0287842 A1* | 11/2009 | Plamondon | 709/233 |
| 2010/0036903 A1* | 2/2010 | Ahmad et al. | 709/202 |
| 2010/0057828 A1* | 3/2010 | Hofmann et al. | 709/202 |
| 2010/0107172 A1* | 4/2010 | Calinescu et al. | 718/104 |
| 2010/0125565 A1* | 5/2010 | Burger et al. | 707/713 |
| 2010/0217860 A1 | 8/2010 | Naidu et al. | |
| 2010/0251335 A1* | 9/2010 | Srisuresh et al. | 726/3 |
| 2010/0281112 A1* | 11/2010 | Plamondon | 709/203 |
| 2010/0332664 A1 | 12/2010 | Yevmenkin et al. | |
| 2011/0016214 A1* | 1/2011 | Jackson | 709/226 |
| 2011/0276396 A1* | 11/2011 | Rathod | 705/14.49 |
| 2011/0289508 A1* | 11/2011 | Fell et al. | 718/105 |
| 2012/0110193 A1* | 5/2012 | Zhou et al. | 709/227 |
| 2012/0297067 A1 | 11/2012 | Arrowood et al. | |

* cited by examiner

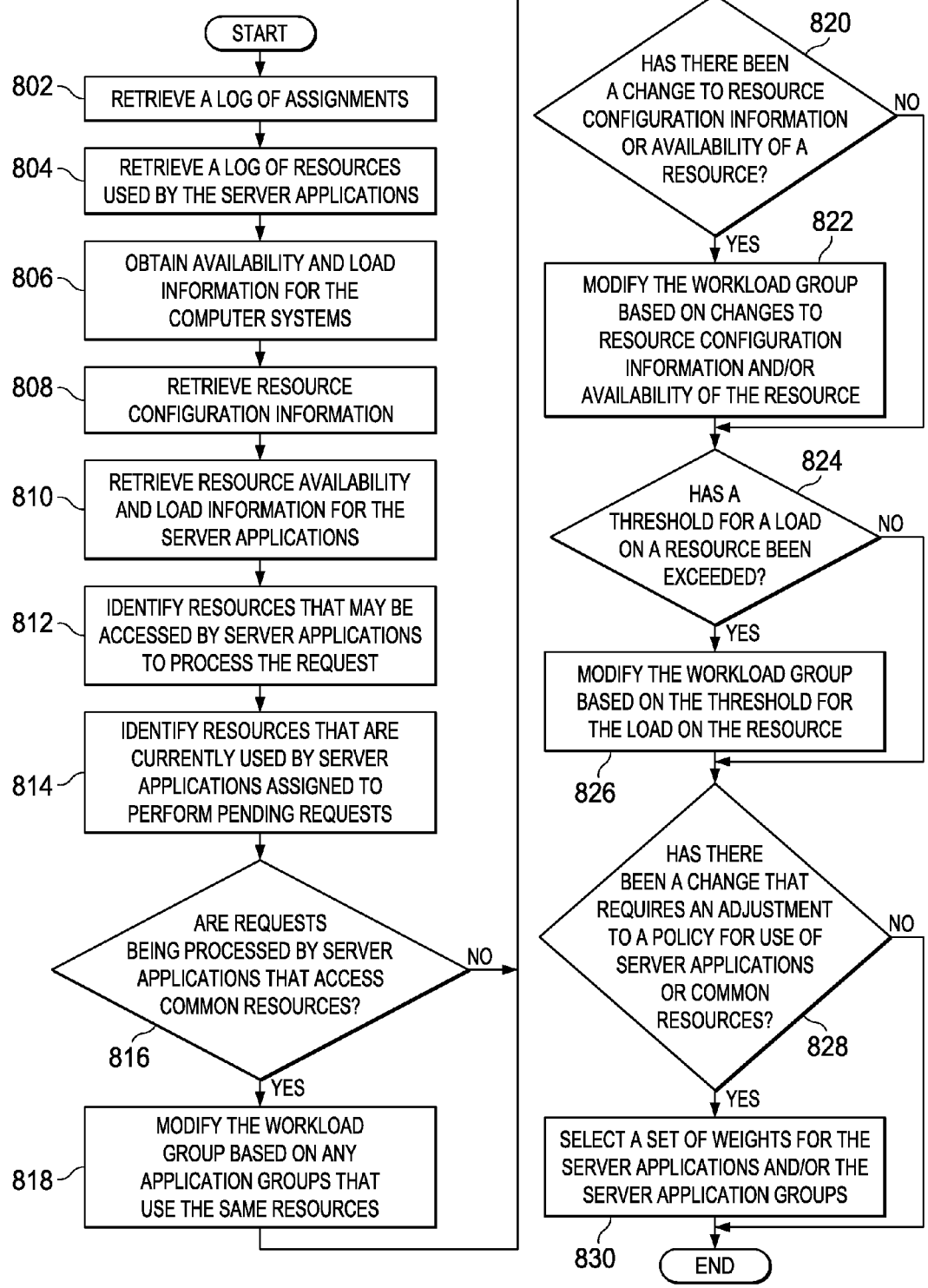

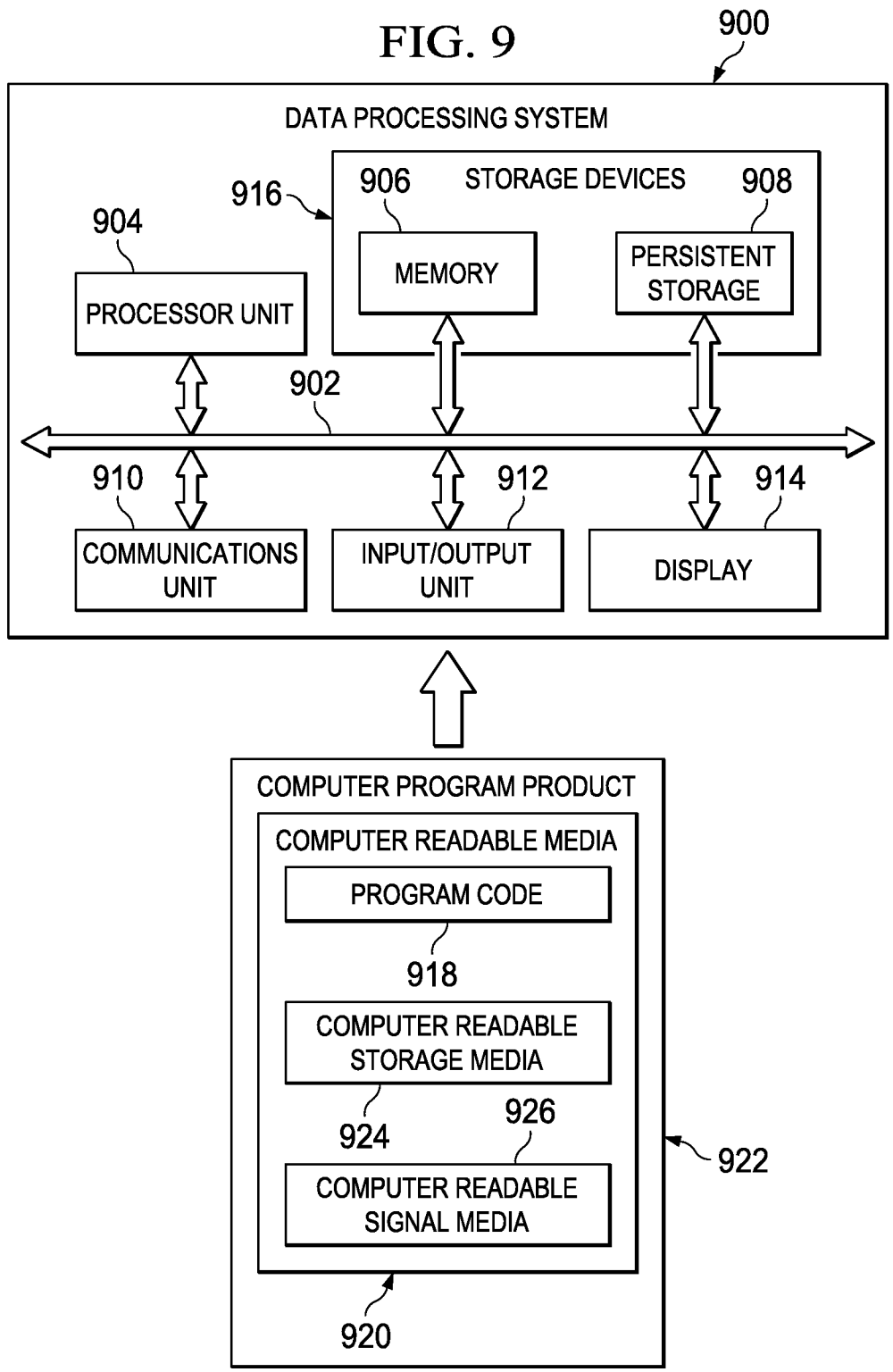

LOAD BALANCING WORKLOAD GROUPS

This application is a continuation of application Ser. No. 13/111,329, filed May 19, 2011, status pending.

BACKGROUND

1. Field

The disclosure relates generally to data processing systems and, in particular, to managing requests received from clients. Still more particularly, the present disclosure relates to load balancing in managing requests received from clients.

2. Description of the Related Art

The Internet is a global system of computer networks that are connected to each other. These networks may be private, public, government, and/or other types of networks. The Internet is used to provide various services and content to users. For example, many users may visit websites to obtain information, download files, purchase goods and services, make financial transactions, and perform other operations.

Organizations put up websites on the Internet to provide goods and services to users. A website may receive many requests for processing. One manner in which requests may be handled is to use multiple server computers with server applications that handle the requests. With this architecture, distributing requests across the server computers is desirable to maintain a desired level of responsiveness in processing the requests.

Load balancing is a technique that is used to distribute the workload across multiple computers, computer clusters, or other resources to increase the use of those resources. Further, load balancing also may be used to increase reliability through providing redundancy for different resources.

Load balancing may be provided through software, hardware, or a combination of the two. A switch, a domain name server, and other types of devices may be used to provide load balancing.

A load balancer typically listens on a cluster internet protocol address and port where clients connect to access services. Multiple server applications may be put together as a server application group. The load balancer sends requests to these server applications in the server application group. Each of the server applications in a server application group is usually identified by a unique Internet protocol address. Typically, all of the server applications in the group have the same port number. The load balancer forwards the requests to one of the server applications. The requests are sent to server applications using their respective Internet protocol address.

The manner in which requests are forwarded to different server applications may be performed in different ways. For example, if a service is provided by five servers, a load balancer may distribute requests for processing to those servers in a manner that increases the speed at which requests can be processed. In other words, the load balancer attempts to even out or manage the workloads on the different servers.

This type of load balancing may be performed in a number of different ways. For example, a round robin system may be used to alternate which server receives requests each time a request is received from a client. In another example, requests may be sent to servers based on the available system resources and workload on the server. The different servers may send information about resource availability and workload to a workload manager component. The workload manager uses the information to generate recommendations on how requests should be distributed. The load balancer may then use these recommendations to distribute requests for processing.

SUMMARY

In one illustrative embodiment, a method for managing requests is provided. The requests are received by a workload manager system to perform operations on data. A set of server applications is identified by the workload manager system to perform the operations in the requests based on a set of common resources used by the set of server applications. The set of server applications is in a workload group, and the workload group is comprised of a plurality of application groups.

BRIEF DESCRIPTION OF THE SEVERAL VIEWS OF THE DRAWINGS

FIG. 8 is an illustration of a flowchart of a process for identifying a set of server applications and a set of weights for use in a policy for managing requests in accordance with an illustrative embodiment; and FIG. 9 is an illustration of a data processing system in accordance with an illustrative embodiment.

DETAILED DESCRIPTION

Figure 1:
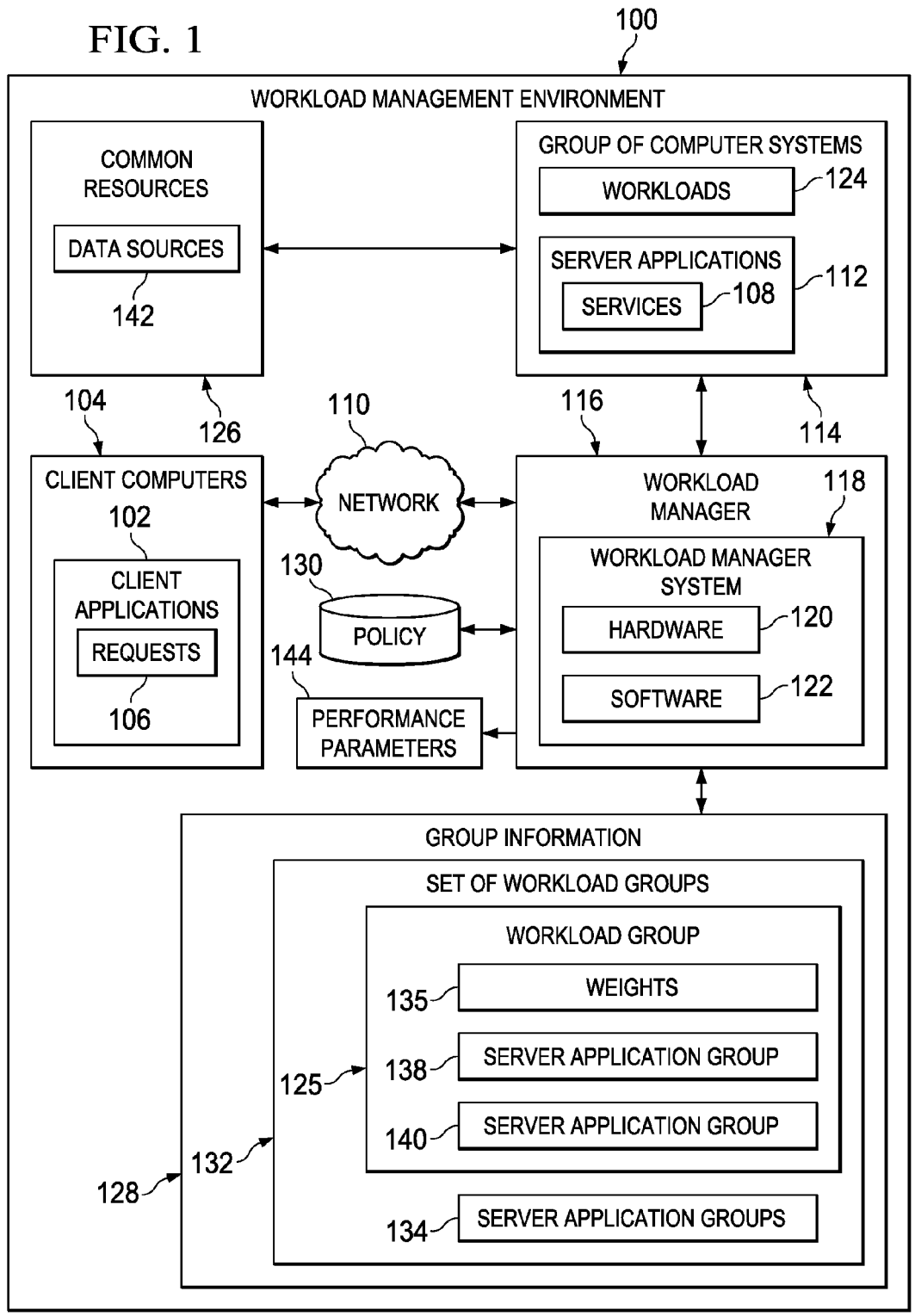
FIG. 1 is an illustration of a workload management environment in accordance with an illustrative embodiment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object-oriented programming language, such as Java, Smalltalk, C++, or the like, and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which run on the computer or other programmable apparatus provide processes for implementing the functions/acts specified in the flowchart and/or block diagram block or blocks.

The illustrative embodiments recognize and take into account a number of different considerations. "A number", as used herein with reference to items, means one or more items. For example, "a number of considerations" is one or more considerations.

The illustrative embodiments recognize and take into account that server applications may be located on the same computer, different computers within a cluster, or different clusters. In these illustrative examples, a computer cluster is a group of computers that work in a manner to appear as a single computer. The different computers are typically connected to each other but not always connected to each other through local area networks. Computer clusters are used to improve performance and availability over that of a single computer.

The different illustrative embodiments recognize and take into account that current load balancing techniques do not provide load balancing beyond a single server application group. In other words, the current load balancing techniques balance the distribution of requests within a group, but not between groups.

The different illustrative embodiments recognize and take into account that server applications may access the same resource. In particular, server applications in different groups may access the same resource.

For example, different server applications may use the same table in the database, the same rows in a table in a database, the same file, the same memory location, or other suitable types of resources. The illustrative embodiments recognize and take into account that it may be desirable to distribute requests to the different applications that are located on the same computer system.

In these illustrative examples, a computer system is one or more computers. When the computer system is more than one computer, the computer system may take the form of a computer cluster.

By having requests sent to server applications on the same computer system, updates made by the different server applications may be performed to the same copy of data, such as a table or database. In this manner, an opportunity for conflicts occurring between this copy of the data and another copy located elsewhere may be reduced. Further, when locks occur on data, these locks may be released more quickly when the lock on the copy of data is the same copy that is to be accessed by a server application rather than a copy of the data at another location. In other words, when locks occur across different copies of data, the time needed to release those locks and synchronize data may take more time than desired.

With this situation, the different illustrative embodiments recognize and take into account that having all updates to the same data source may reduce a chance of conflicts occurring if the different server applications operated on different data sources were synchronized. The different illustrative embodiments also recognize and take into account that data may be incorrect before synchronization occurs between the instances of the data sources being synchronized.

Thus, the different illustrative embodiments provide a method and apparatus to distribute requests to different server applications on the same computer system. For example, a workload manager may receive requests to perform operations on data. The workload manager may identify a set of server applications to perform the operations in the requests based on a set of common resources used by the set of server applications, wherein the set of server applications is in a workload group, and the workload group is comprised of a plurality of application groups.

With reference now to the figures and, in particular, with reference now to FIG. 1, an illustration of a workload management environment is depicted in accordance with an illustrative embodiment. In this illustrative example, workload management environment 100 is depicted in block diagram form.

Client applications 102 run on client computers 104 within workload management environment 100. Client applications 102 may take various forms. For example, client applications 102 may be at least one of a browser, a spreadsheet application, a database application, a web crawler, and/or other suitable types of applications.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

As depicted, client applications 102 generate requests 106 for services 108. Services 108 may include, for example, at least one of retrieving a file, retrieving a webpage, writing data, downloading a program, deleting a file, and/or other suitable types of access.

In these illustrative examples, requests 106 are sent over network 110 to server applications 112 on group of computer systems 114. Server applications 112 may be any applications configured to process requests 106 to provide services 108. Server applications 112 may be, for example, at least one of a database server, a file transfer protocol (FTP) server, a web server, a mail server, and/or other suitable types of applications. In these illustrative examples, computer systems within group of computer systems 114 may be a computer, a computer cluster, or other configurations of computer systems configured to run server applications 112.

Workload manager 116 sends requests 106 to server applications 112. Workload manager 116 may be implemented using hardware, software, or a combination of the two. When implemented with hardware, workload manager 116 takes the form of workload manager system 118.

Workload manager system 118 comprises hardware 120 and also may include software 122. Hardware 120 may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices may include, for example, a programmable logic array, programmable array logic, a field programmable logic array, a field programmable gate array, and/or other suitable hardware devices. Additionally, the processes may be implemented in organic components integrated with inorganic components and/or may be comprised entirely of organic components excluding a human being. When processor units are used in hardware 120, these processor units may be located on the same or different computers.

In these illustrative examples, workload manager 116 is configured to balance workloads 124 in group of computer systems 114. Workloads 124 are balanced by the manner in which workload manager 116 distributes requests 106 to server applications 112 running on group of computer systems 114.

Workload manager 116 may be implemented in a number of different ways. For example, workload manager 116 may include load balancing processes and may directly distribute requests 106 to server applications 112. In other illustrative examples, workload manager 116 may make recommendations for the distribution of requests 106. These recommendations may then be used by a load balancer implemented as a separate component to distribute requests 106 to server applications 112.

The different illustrative embodiments recognize that server applications 112 may access common resources 126 when processing requests 106. Common resources 126 may include data sources, storage systems, processor systems, routing systems, and/or other suitable types of resources. Resources may take the form of hardware, data, software, or other suitable forms. A common resource within common resources 126 is a resource that is used by two or more server applications within server applications 112.

Workload manager 116 identifies which of server applications 112 receive particular requests from requests 106 based on common resources 126 used by server applications 112. Workload manager 116 may be implemented in various devices. For example, workload manager 116 may be implemented in a switch, a domain name server, and/or other suitable types of hardware devices.

In these illustrative examples, workload manager 116 selects a server application within server applications 112 to process a request in requests 106 based on group information 128 and policy 130. Group information 128, in these examples, is groupings of server applications 112. For example, group information 128 comprises set of workload groups 132. Set of workload groups 132 is comprised of server application groups 134. Each workload group in set of workload groups 132 has two or more server application groups from server application groups 134. In addition, weights 135 may be associated with server application groups 134. In other words, each server application in a server application group may have one or more weights. Additionally, each server application group also may be assigned one or more weights. Weights 135 are used with policy 130 in these illustrative examples.

Policy 130 is one or more rules for determining which of server applications 112 receive particular requests in requests 106. Policy 130 may include rules for assigning requests 106 based on common resources 126. Weights 135 may be applied to policy 130 in assigning requests 106 based on common resources 126. For example, a rule in policy 130 may be to assign all requests to server applications 112 that use a particular common resource. For example, the common resource may be a computer system in group of computer systems 114. As another example, when accessing data sources, two data sources may be copies of each other in which different server applications in server applications 112 are assigned to each of the copies of the data source. These data sources may be synchronized or updated at some point so that the copies are identical. With this type of resource, policy 130 may include a rule that states that access to a particular cell, record, entry, table, or other portion of a data source are all made to the same copy.

In the illustrative examples, workload manager 116 performs load balancing for a workload group. Each server application group has one or more server applications. Typically, load balancing is performed with respect to a server application group. In the illustrative examples, workload manager 116 is further configured to provide load balancing based on workload groups.

For example, workload group 125 in set of workload groups 132 includes server application group 138 and server application group 140. Some of the server applications in server application group 138 may run on the same computer system as some of the server applications in server application group 140. This is one example of a use of common resources 126. As another example, some of the server applications in server application group 138 may access the same data sources as some of the server applications in server application group 140. This access to data resources is another example of common resources 126.

By load balancing using server applications from server application group 138 and server application group 140 that use common resources 126, improved performance may occur. For example, if common resources 126 include data sources 142 that are synchronized between different server applications in server application group 138 and server application group 140, distributing the requests to server applications that use the same data source may reduce conflicts between data sources 142 when data sources 142 are replicated.

In these illustrative examples, server applications in server application group 138 and server application group 140 that use the same data source in data sources 142 are considered to be on the same computer system. As a result, server applications in the same cluster that end up in different server groups may be taken into account in load balancing when those server groups are put together into a workload group. Workload manager 116 may use the mapping of server application groups into a workload group to provide better load balancing with respect to distributing requests to server applications 112 that use common resources 126 as compared to load balancing just within a server application group.

Workload manager 116 also may identify performance parameters 144 generated during processing of requests 106. Performance parameters 144 are any values that relate to the use of resources to process requests 106. These resources may include common resources 126. Results from analyzing performance parameters 144 may be used to identify inefficiencies in accessing common resources 126. The result may be used to modify group information 128. Inefficiencies may include, for example, without limitation, conflicts in data, a larger than desired number of locks for data, data access requiring more time than desired, under use of a hardware resource, and other inefficiencies.

The modification of group information 128 may include adding a workload group, changing server application groups within a workload group, deleting a workload group, and/or other suitable modifications. Further, changing values for weights 135 in policy 130 also may occur using the results from the analysis of performance parameters 144.

The illustration of workload management environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment. For example, in some illustrative examples, additional workload managers, in addition to workload manager 116, may be present within network 110.

For example, although workload manager 116 is shown as a block separate from group of computer systems 114, workload manager 116 may be implemented in one or more computer systems in group of computer systems 114.

Figure 2:
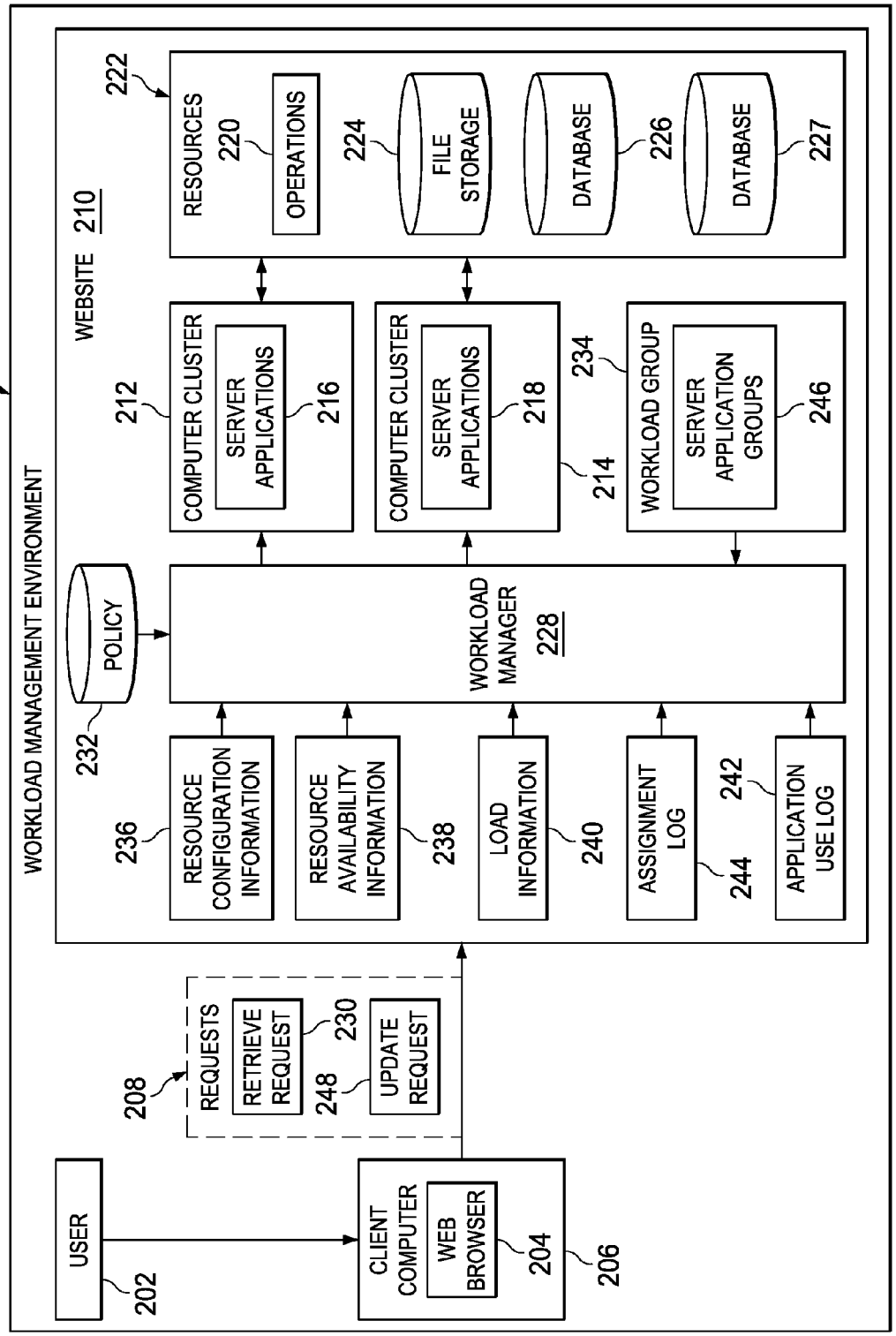
FIG. 2 is an illustration of a workload management environment in accordance with an illustrative embodiment.

With reference now to FIG. 2, an illustration of a workload management environment is depicted in accordance with an illustrative embodiment. Workload management environment 200 is an example of one implementation of workload management environment 100 in FIG. 1.

In this illustrative example, user 202 may interact with web browser 204 running on client computer 206 to generate requests 208 for website 210. In this illustrative example, website 210 includes computer cluster 212 and computer cluster 214. Server applications 216 run on computer cluster 212. Server applications 218 run on computer cluster 214.

In these illustrative examples, computer cluster 212 and computer cluster 214 are examples of computer systems in group of computer systems 114 in FIG. 1. In other words, computer cluster 212 and computer cluster 214 form a group of computer systems.

Server applications 216 and server applications 218 perform operations 220 using resources 222. In these illustrative examples, resources 222 comprise file storage 224, database 226, and database 227. Workload manager 228 identifies server applications within server applications 216 and server applications 218 to process requests 208.

In one illustrative example, user 202 may wish to obtain information about items offered on website 210. User 202 may generate a request to obtain information about those items in requests 208. This request takes the form of retrieve request 230 in this illustrative example.

When workload manager 228 receives retrieve request 230, workload manager 228 identifies a server application within server applications 216 and server applications 218 to process retrieve request 230. Workload manager 228 identifies a type of application that is used to process retrieve request 230 in these examples. This type of application may be, for example, without limitation, a webpage server application.

Based on the type of server application identified, workload manager 228 may then identify server applications of that type from server applications 216 and server applications 218. In these illustrative examples, workload manager 228 identifies a particular server application using policy 232 and workload group 234. Policy 232 is one or more rules used to determine what server applications within workload group 234 should receive a request.

In applying policy 232 using workload group 234 to identify which server application should process retrieve request 230, workload manager 228 may use additional information. For example, workload manager 228 may use resource configuration information 236, resource availability information 238, and load information 240.

Resource configuration information 236 identifies resources that may be accessed by server applications 216 and server applications 218. In this example, these resources are resources 222 and, in particular, file storage 224, database 226, and database 227.

Resource availability information 238 identifies resources within resources 222 that are currently available to server applications 216 and server applications 218. In other words, resource availability information 238 indicates what resources can actually be accessed by server applications 216 and server applications 218. This availability is in contrast to what resources server applications 216 and server applications 218 should be able to access. For example, in some cases, a resource may be offline or unavailable for some other reason.

Load information 240 identifies the workload on the different server applications. In other words, load information 240 identifies information, such as how many requests each server application has to process. This information also may identify what hardware resources are being used within computer cluster 212 and computer cluster 214.

In addition to using this information, workload manager 228 also may use application use log 242 and assignment log 244 to decide what server application in server applications 216 and server applications 218 may be assigned to process retrieve request 230. Application use log 242 identifies the use of resources 222 by different server applications in server applications 216 and server applications 218. Assignment log 244 identifies requests already assigned to server applications 216 and server applications 218 for processing.

Some or all of this information may be used to identify what server application is to be used to process retrieve request 230. In these illustrative examples, the server application is selected using server applications identified in workload group 234.

Workload group 234, in this illustrative example, comprises server application groups 246. A server application group within server application groups 246 may include server applications that are located on computer cluster 212 and computer cluster 214. The composition of the server application groups may sometimes result in an inability to assign retrieve request 230 to server applications that use common resources within resources 222.

For example, server applications in a server application group may be located on different computer systems. As a result, the server applications within a server application group may not access a common resource when the common resource is the computer system. As another example, the server applications within a server application group may be assigned to access different copies of a data source. This situation also may result in an inability to send retrieve request 230 to a server application that accesses a common resource.

The different illustrative embodiments may combine or map server application groups 246 into workload group 234. As a result, server applications from different server application groups may have common resources that they use.

In another illustrative example, user 202 may interact with web browser 204 to generate a request that updates data for use in a database. In this example, the request takes the form of update request 248. Update request 248 may be generated when user 202 wishes to update user information, write a review on an item, order an item, or perform some other similar operation.

In these illustrative examples, it may be desirable to have update request 248 performed by a server application within server applications 216 and server applications 218 in which the server applications use a common resource within resources 222. For example, some server applications in server applications 216 running on computer cluster 212 may use database 226, while other server applications in server applications 216 use database 227. Also, some server applications in server applications 218 running on computer cluster 214 use database 226, while other server applications in server applications 218 use database 227.

Database 226 and database 227 are copies of the same information. Database 226 and database 227 may be updated to make sure that the information is the same on both databases. However, conflicts or undesired differences in data may be present if server applications 216 attempt to use database 226 at the same time that server applications 218 use database 227 when an update has not been made. In some cases, a locking mechanism may be used to prevent the difference in data. However, these locking mechanisms may reduce the performance of web browser 204. As a result, it may be desirable to have some operations performed on the same copy of the database.

For example, update request 248 may be a request to update user information, such as an address, for user 202 on website 210. The information may be updated by a server application that has access to database 226. In this example, a request may also be received from an order generation process that generates an order for user 202. This request should be sent to an application server that uses database 226 instead of database 227. The selection of server applications reduces time or avoids conflicts when the requests include records for user 202.

If a request from an order generation process is processed by a server that accesses database 226, then update request 248 should be performed on database 226 rather than on database 227. In this particular example, if the order generation process generates an order for user 202 using database 226 and the user initiates update request 248 to update an address for user 202 on database 227 and database 226 and database 227 have not been updated, then the order may use the wrong address for user 202.

Thus, the illustrative embodiments map or assign server application groups 246 to workload group 234. With workload group 234, workload manager 228 assigns requests 208 in a manner that meets policy 232. Policy 232 may be set for various reasons, such as reducing or eliminating loads from computer cluster 214 for performing maintenance or movement of server applications 218 to another computer cluster. As another example, policy 232 may state that when certain portions of a resource, such as database 226, are used, then other requests that access those portions of database 226 also should be assigned to server applications on the same computer cluster.

The illustration of workload management environment 200 in FIG. 2 has been presented for illustrating one manner in which workload management environment 100 in FIG. 1 may be implemented. This illustration is not meant to imply limitations to the manner in which workload management environment 100 may be implemented in other examples. For example, in other illustrative examples, the computer systems also may include just a computer in addition to computer cluster 212 and computer cluster 214. In still other illustrative examples, additional computer clusters may be present. Also, additional workload managers, in addition to workload manager 228, may be used. Other workload groups may be present in addition to workload group 234.

Figure 3:
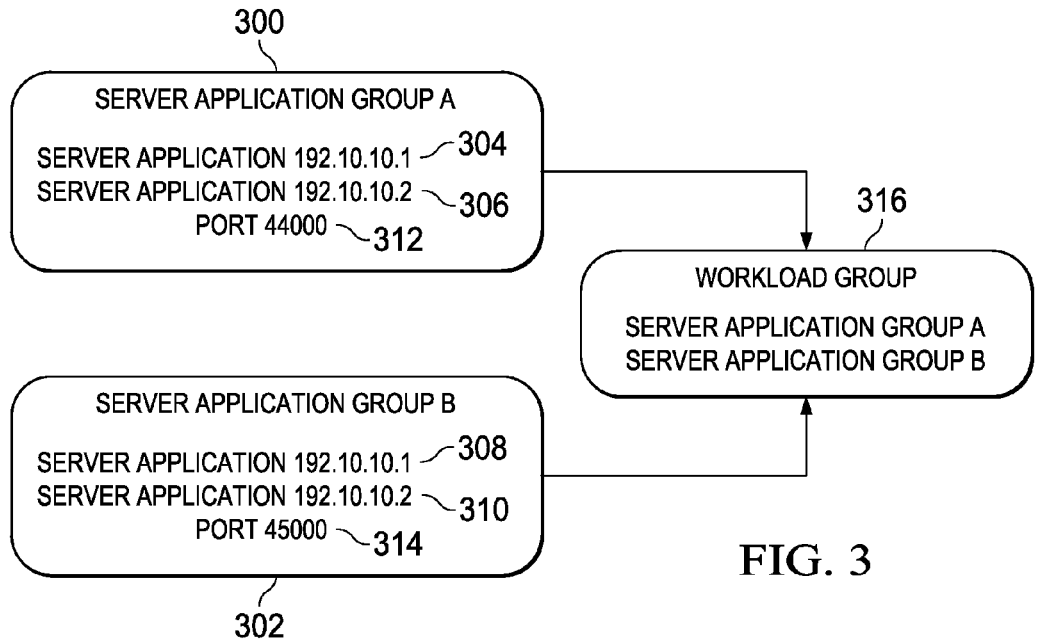
FIG. 3 is an illustration of server application groups mapped to a workload group in accordance with an illustrative embodiment.
Figure 4:
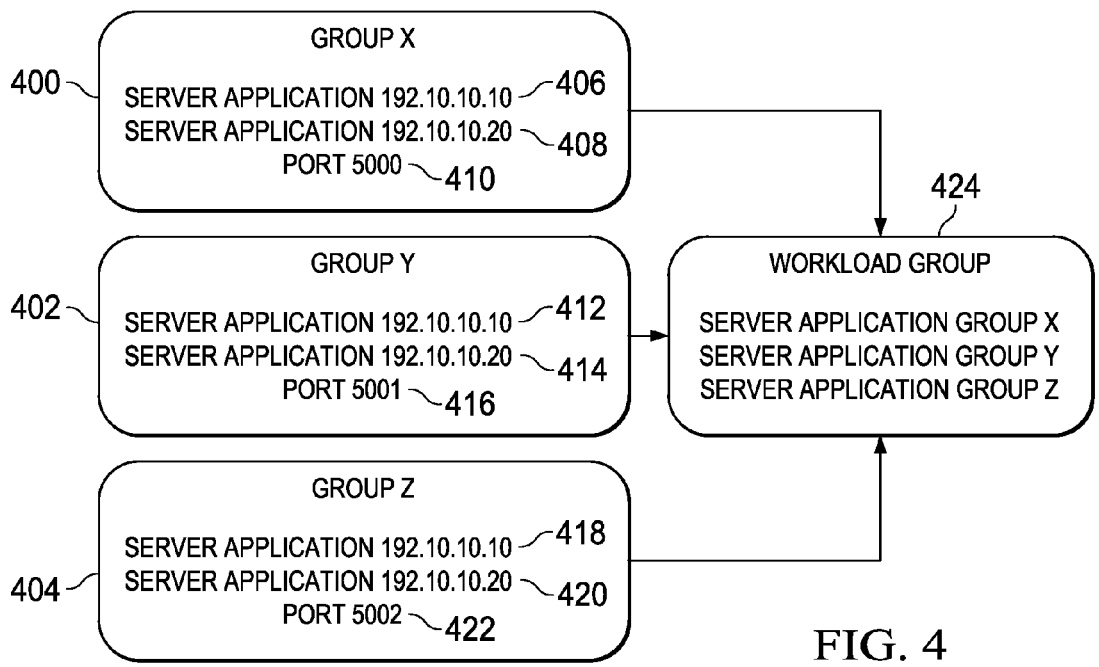
FIG. 4 is an illustration of server application groups mapped to a workload group in accordance with an illustrative embodiment.
Figure 5:
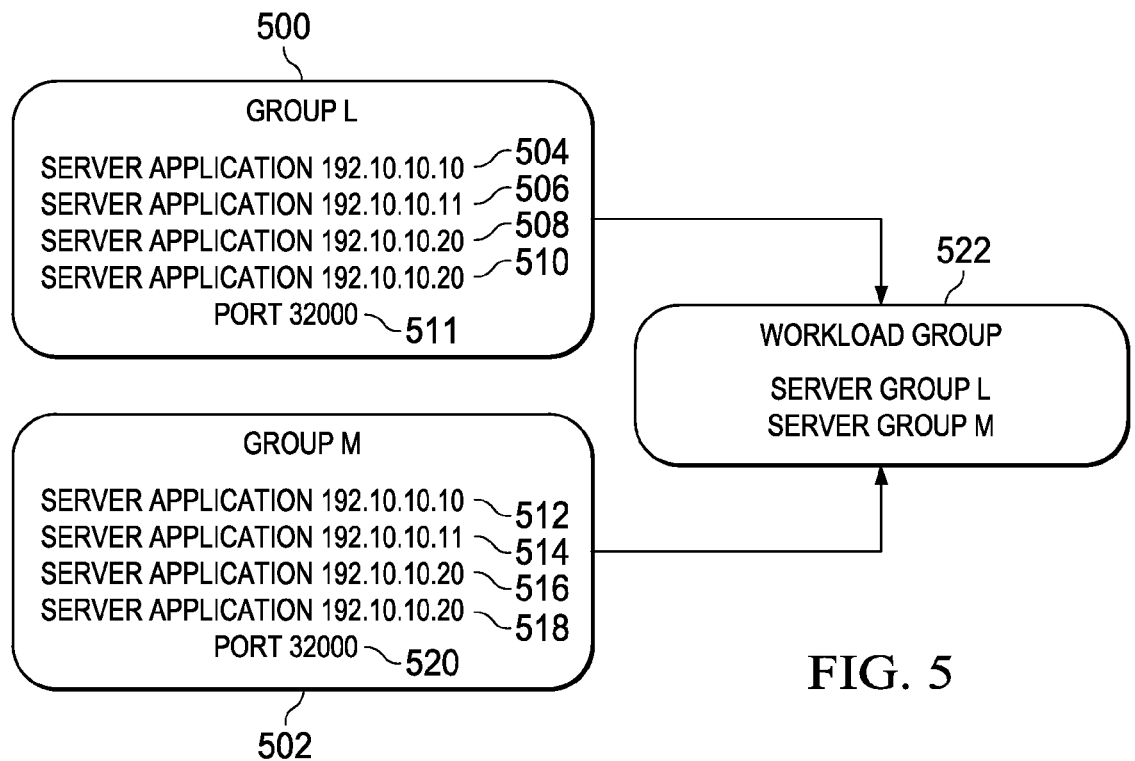
FIG. 5 is an illustration of a mapping of server application groups to workload groups in accordance with an illustrative embodiment.

In FIGS. 3-5, illustrations of server application groups mapped into a workload groups are illustrated. These illustrations are examples illustrating how workload groups may be used in identifying server applications to process requests.

With reference first to FIG. 3, an illustration of server application groups mapped to a workload group is depicted in accordance with an illustrative embodiment. In this depicted example, the server application groups include server application group A 300 and server application group B 302.

Server application group A 300 comprises server application 304 and server application 306. Server application group B 302 comprises server application 308 and server application 310. In this example, server application 304 and server application 308 are in different server application groups, but both have the same address. This similar address indicates that both of the server applications are on the same computer system. Server application 306 and server application 310 are both in different server application groups but also have the same address with respect to each other. These two server applications also are on the same computer system.

Requests coming over port 312 are typically assigned to the server applications in server application group A 300. Requests sent over port 314 typically are sent to the server applications in server application group B 302.

In these illustrative examples, workload group 316 includes server application group A 300 and server application group B 302. As a result, requests sent over port 312 may be sent to either server application (residing on different computer systems) in server application group A 300, as well as server applications in server application group B 302, depending on the results of load balancing.

In a similar fashion, requests sent over port 314 also may be sent to either server application (residing on different computer systems) in server application group A 300 and server application group B 302, depending on the results of load balancing. As a result, with the use of workload group 316, a workload manager may use this mapping of server application groups to make recommendations or send requests to different server applications.

When a request is received, the selection of a server application may be made such that the request is sent to the same computer system. In this example, the computer system is an example of a common resource. For example, server application 304 and server application 308 are on the same computer system. Server application 306 and server application 310 also are on the same computer system. In this example, server applications on the same computer system access the same data sources.

With reference next to FIG. 4, an illustration of server application groups mapped to a workload group is depicted in accordance with an illustrative embodiment. In this illustrative example, server application group X 400, server application group Y 402, and server application group Z 404 are illustrated.

Server application group X 400 includes server application 406 and server application 408. Port 410 is assigned to server application group X 400. Server application group Y 402 includes server application 412 and server application 414. Port 416 is assigned to server application group Y 402. Server application group Z 404 includes server application 418 and server application 420. Port 422 is assigned to server application group Z 404.

In this illustrative example, server application group X 400, server application group Y 402, and server application group Z 404 are mapped to workload group 424. In other words, workload group 424 includes these three server application groups.

As depicted, server application 406, server application 412, and server application 418 have the same address. In these examples, these three server applications are on the same computer system. Server application 408, server application 414, and server application 420 also have the same address. These three server applications also are located on the same computer system.

With workload group 424, a policy used by the workload manager may state that all of the requests are to be sent to the same computer system. For example, the policy may state that the requests should go to server applications on the computer system with the address 192.10.10.10. In this example, the computer system with server applications 408, 414, and 420 may be scheduled or in the process of being moved to another computer system. In this manner, workload requests may be transferred to one computer system, while the server applications on the other computer system are being moved to a different computer system.

In FIG. 5, another example of a mapping of server application groups to a workload group is depicted in accordance with an illustrative embodiment. In this illustrative example, server application group L 500 and server application group M 502 are present.

Server application group L 500 includes server application 504, server application 506, server application 508, and server application 510. This group is assigned to port 511. Server application group M 502 includes server application group 512, server application 514, server application 516, and server application 518. This group is assigned to port 520. Server application group L 500 and server application group M 502 are part of workload group 522.

In this example, server application 504, server application 506, server application 512, and server application 514 are all located on the same computer system. Server application 508, server application 510, server application 516, and server application 518 are located on the same computer system.

With this mapping in workload group 522, a workload manager ensures that requests are only distributed to one of the computer systems between the available server applications for each computer system. If each of the server applications access the same data sources on a computer system and a situation arises that requires access to data sources on a different computer system, the workload requests may be moved to the other computer system at the same time or substantially the same time. This type of movement may avoid data conflicts with attempts to update the data sources on both computer systems at the same time.

The illustration of the work groups and server application groups in FIGS. 3-5 are for purposes of illustrating example implementations for group information 128 in FIG. 1. These illustrations are merely illustrative examples and are not meant to imply limitations to the manner in which other server application groups and workload groups may be implemented. For example, although not shown in these figures, weights may be associated with server applications within server application groups. Additionally weights also may be associated with these server application groups in a workload group.

Figure 6:
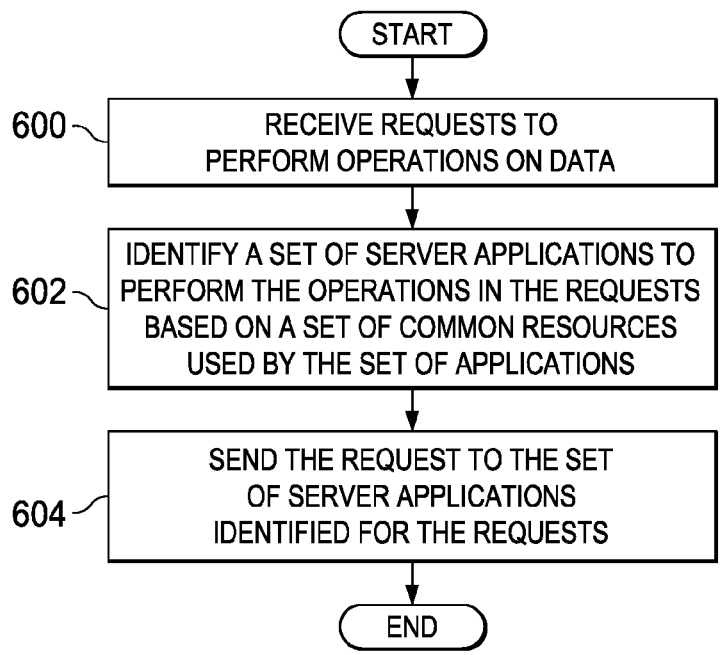
FIG. 6 is an illustration of a flowchart of a process for managing requests in accordance with an illustrative embodiment.

With reference now to FIG. 6, an illustration of a flowchart of a process for managing requests is depicted in accordance with an illustrative embodiment. The process illustrated in FIG. 6 may be implemented in workload management environment 100 in FIG. 1. In particular, these different steps may be implemented in workload manager 116 in FIG. 1. The steps may be implemented using software, hardware, or a combination of the two.

The process begins by receiving requests to perform operations on data (step 600). The process identifies a set of server applications to perform the operations in the requests based on a set of common resources used by the set of applications (step 602). The set of server applications is in a workload group that is comprised of a plurality of application groups. For example, one server application in the set of server applications may be selected to perform an operation that accesses a data source. Another application may be selected for the set of server applications that also accesses the same data source. In this manner, the set of server applications is selected based on a use of common resources. In another example, the request may be based on the selection of a server application that is on a particular computer system. Another request also may be sent to the same or different server applications that are located on the same computer system. This type of selection is another example of identifying server applications based on common resources. The process then sends the request to the set of server applications identified for the requests (step 604), with the process terminating thereafter.

Figure 7:
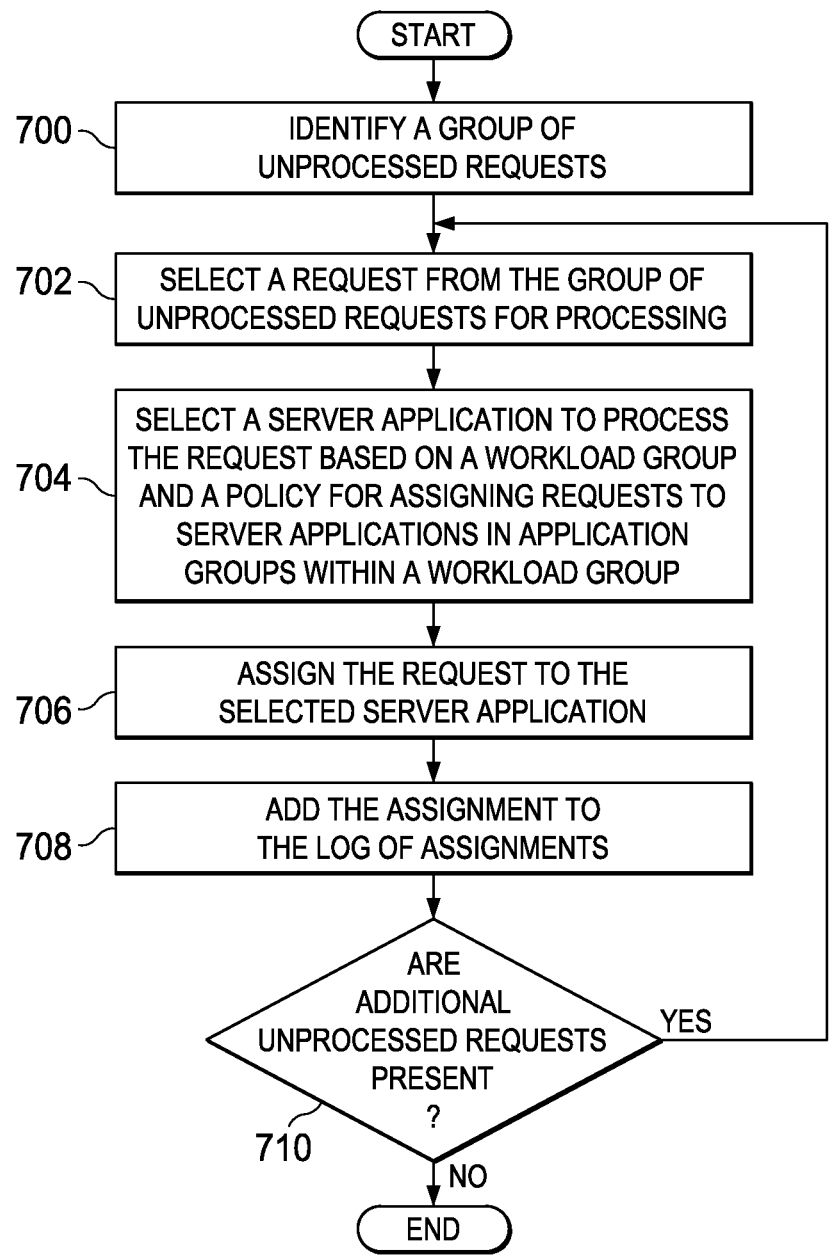
FIG. 7 is a more-detailed illustration of a flowchart of a process for identifying a set of server applications to perform operations in accordance with an illustrative embodiment.

With reference now to FIG. 7, a more-detailed illustration of a process for identifying a set of server applications to perform operations is depicted in accordance with an illustrative embodiment. The process illustrated in FIG. 7 is an example of one manner in which step 602 in FIG. 6 may be implemented.

The process begins by identifying a group of unprocessed requests (step 700). The group of unprocessed requests is one or more requests that have not been assigned a server application for processing. The process then selects a request from the group of unprocessed requests for processing (step 702).

The process selects a server application to process the request based on a workload group and a policy for assigning requests to server applications in application groups within a workload group (step 704). The process then assigns the request to the selected server application (step 706). The assignment is added to the log of assignments (step 708). A determination is then made as to whether additional unprocessed requests are present (step 710). If additional unprocessed requests are present, the process returns to step 702. Otherwise, the process terminates.

With reference now to FIG. 8, an illustration of a flowchart of a process for identifying a set of server applications and a set of weights for use in a policy for managing requests is depicted in accordance with an illustrative embodiment. The process illustrated in FIG. 8 may be implemented in workload management environment 100 in FIG. 1. In particular, these different steps may be implemented in workload manager 116 in FIG. 1. The steps may be implemented using software, hardware, or a combination of the two.

The process illustrated in FIG. 8 can be performed by workload manager 116 on an intermittent basis, in response to a change to workload management environment 100, in response to a notification that the process should be run, or in response to some other event. The intermittent basis for running the process may be, for example, a particular amount of time has elapsed since the last running of the process. The change to workload management environment 100 may be the result of a user modification of the environment. For example, a user modification of policy 232 or resource configuration information 236 in FIG. 2 may, in turn, cause workload manager 116 to determine if the process illustrated in FIG. 8 should be performed.

A log of assignments is retrieved (step 802). This step retrieves a historical work record of assignments that have been made for requests previously received. The process then retrieves a log of resources used by the server applications (step 804). This log identifies the resources used by the different server applications in processing requests. Further, this log also may include an identification of the type of requests performed on a particular resource. These operations may include, for example, without limitation, retrieving, updating, creating, deleting, and any other suitable operation on the resource.

Availability and load information for the computer systems is obtained (step 806). This information may be retrieved from the computer systems or other devices that monitor resource usage and availability for computer systems. The process also retrieves resource configuration information (step 808). Resource configuration information identifies resources that may be needed or used by the application. In particular, the resource configuration information identifies resources that may be accessed by the server application. This information may be used to identify common resources that are used by the computer systems. In particular, the information in step 808 may be used to identify which server applications will receive a particular request.

The process then retrieves resources availability and load information for the server applications (step 810). This information identifies the resources that are currently available to the server applications. Additionally, this information includes the workloads for the different server applications. This information also may be used with the information in step 808 to determine which server application is to receive a request for processing. For example, in some cases, a particular server application may not have access to a resource, such as a database, because of connectivity or other issues. Also, in some cases, the server application may have a large workload as compared to other server applications that may use the same resource. For example, one server application may have 30 requests in a queue, while another server application only has three. As a result, this information also may be used in addition to the identification of common resources assigned to the server applications in step 808. In particular, this information also may be used to supplement the assignments to identify what resources and what processing availability different server applications have.

The process then identifies resources that may be accessed by server applications to process the request (step 812). This step identifies the resources that may be needed to process a particular request. The identification of resources that may be accessed by server applications to process particular requests may be retrieved from policy 232 and/or resource configuration information 236 in FIG. 2. For example, the process may use rules from policy 232 to identify server application types that are needed to process the particular requests. The process also uses resource configuration information 236 to identify resources that may be accessed by server applications of the identified server application type. These server application types are, for example, server applications 216 and server applications 218 of the server application type identified using policy 232.

Further, the identification of resources that may be accessed by server applications to process particular requests may be stored in a rule in policy 232, stored in resource configuration information 236, and/or stored in memory for ease of access by the process. In particular, this information also may be used to supplement the assignments to identify what resources different server applications may use.

The process then identifies resources that are currently used by server applications assigned to perform pending requests (step 814). The identification of resources currently in use by server applications may be identified from the log of resources used by the server applications. For example, the log of resources used by the server applications may indicate server applications 216 have locked a record in database 226 and server applications 218 have a pending update in database 227. In particular, this information also may be used to identify what resources are in use by different server applications.

A determination is made as to whether requests are being processed by the server applications that access common resources (step 816). If requests are being processed by the server applications that access common resources, the process modifies the workload group based on any application groups that access the same resources (step 818). The modification of the workload group based on application groups that access the same resources may be performed using a rule, such as a rule in policy 232, for restricting or enforcing access to the same resource or resources. For example, a rule in policy 232 may require the process to combine application groups, such as server application group A 300 and server application group B 302, into a workload group, such as workload group 316. The combination may be based on a determination that the application groups comprise server applications that access the same resource or resources. More specifically, this information also may be used to identify a set of server applications for use in a policy for managing requests.

A determination is made as to whether a change has been made to resource configuration information or the availability of a resource in the resources (step 820). These resources are ones used by a plurality of application groups. If a change has occurred, the process modifies the workload group based on the changes to the resource configuration information and the availability of the resource (step 822). The modification of the workload group based on the changes to the resource configuration information or the availability of the resource may be performed using a rule in policy 232 for ensuring the proper configuration of a resource or resources and availability of the resource or resources.

For example, a rule in policy 232 may require the process to modify a workload group, such as workload group 316. This modification may be based on the process determining that the change to resource configuration information or availability of a resource affects which server application groups should be in the workload group. More specifically, the rule may direct the process to modify workload groups by adding and/or removing server application groups to and/or from workload groups in response to the change to resource configuration information or availability of a resource. In particular, this information also may be used to supplement the identification of a set of server applications for use in a policy for managing requests.

A determination is then made as to whether a threshold for a load on a resource in the resources has been exceeded (step 824). This threshold is for a load on a resource that is used by server applications in a plurality of application groups. If a threshold has been exceeded, the process modifies the workload group based on the threshold for the load on the resource (step 826). The modification of the workload group based on a threshold for a load on a resource that has been exceeded may be performed using a rule, such as a rule in policy 232. In one illustrative example, this rule may restrict or enforce access to the resource based on meeting or exceeding a threshold for use of the resource.

For example, a rule in policy 232 may require the process to modify a workload group, such as workload group 316, based on the process determining that a threshold for a load on a resource has been met or exceeded that affects which server application groups should be in the workload group. More specifically, the rule may direct the process to modify workload groups by adding and/or removing server application groups to and/or from workload groups in response to whether the threshold for the load on the resource has been met or exceeded. This information also may be used to supplement the identification of a set of server applications for use in a policy for managing requests.

A determination is then made as to whether a change has occurred that requires an adjustment to a policy for use of the server applications or the common resources (step 828). If a change has occurred, the process selects a set of weights for the server applications and/or the server application groups (step 830), with the process terminating thereafter. These weights are for use with a policy, such as policy 232 in FIG. 2.

The selection of the set of weights for the server applications and/or the server application groups may be performed using a rule, such as a rule in policy 232, for balancing use of resources. For example, a rule in policy 232 may require an equal weight be given to each server application of each server application group of a workload group that accesses the same resource. By setting an equal weight to each server application of each server application group in the workload group that accesses the same resource, the process ensures that an equal weight is set for each server application that may access the resource regardless of which application group the server application is in.

In another illustrative example, a rule in policy 232 may require that the set of weights be set to values that indicate a particular sequence for selecting server applications be given to each server application of each server application group of a workload group that accesses the same resource. By setting the set of weights in this fashion, the process may ensure that the set of weights reflects a priority for access to the resource by the server applications of the workload group regardless of which application group the server application is in. In particular, this information also may be used to identify a set of weights for use in a policy for managing requests.

With reference again to step 818, if the requests are not being processed by server applications that access common resources, the process proceeds to step 820 as described above. With reference again to step 820, if a change to resource configuration information or the availability of resources has not occurred, the process proceeds to step 824. In step 824, if a threshold for a load on a resource has not been exceeded, the process proceeds directly to step 828. With reference to step 828, if a change that requires an adjustment to a policy for use in server applications or common resources has not occurred, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the block may occur out of the order noted in the figures. For example, in some cases, two blocks shown in succession may be processed substantially concurrently, or the blocks may sometimes be processed in the reverse order, depending upon the functionality involved. Also, other blocks may be added in addition to the illustrated blocks in a flowchart or block diagram.

For example, step 708 may be unnecessary in some examples. As another illustrative example, the selection of a server application may be made from more than one workload group, depending on the implementation. In yet another example, steps 804 and 814 may be optional steps. In other words, one or both of these steps may be omitted, depending on the implementation. Of course, these example modifications to the processes are merely examples of changes that may be made, and other changes may also be made for other illustrative embodiments.

Turning now to FIG. 9, an illustration of a data processing system is depicted in accordance with an illustrative embodiment. In this illustrative example, data processing system 900 includes communications fabric 902, which provides communications between processor unit 904, memory 906, persistent storage 908, communications unit 910, input/output (I/O) unit 912, and display 914. Data processing system 900 is an example of a data processing system that may be used to implement server applications based on common resources. Data processing system 900 is also an example of a data processing system that may be used to implement client computers 104 and computer systems within group of computer systems 114 in FIG. 1. Data processing system 900 also may be used to implement client computer 206 and computers within computer cluster 212 and computer cluster 214 in FIG. 2.

Processor unit 904 serves to process instructions for software that may be loaded into memory 906. Processor unit 904 may be a number of processors, a multi-processor core, or some other type of processor, depending on the particular implementation. A number, as used herein with reference to an item, means one or more items. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for processing by processor unit 904. The processes of the different embodiments may be performed by processor unit 904 using computer-implemented instructions, which may be located in a memory, such as memory 906.

These instructions are referred to as program code, computer usable program code, or computer readable program code that may be read and processed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for processing by processor unit 904. Program code 918 and computer readable media 920 form computer program product 922 in these examples. In one example, computer readable media 920 may be computer readable storage media 924 or computer readable signal media 926.

Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900.

In some instances, computer readable storage media 924 may not be removable from data processing system 900. In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 906, or a cache, such as found in an interface and memory controller hub that may be present in communications fabric 902.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing requests, the method comprising:
   receiving, by a workload manager system, the requests to perform operations on data, wherein the requests are unassigned;
   identifying, by the workload manager system:
   a set of server applications to perform the operations in the requests based on a set of common resources used by the set of server applications, wherein the set of server applications is mapped to a workload group and the workload group is comprised of a plurality of server application groups, wherein the workload group is modified according to one or more rules in a policy in response to information comprising at least one of the server application groups use of the set of common resources;
   a change in a resource configuration information;
   a threshold for a load exceeded;
   weight information comprising one or more weights selectively associated respectively with each of the server application groups in the plurality of server application server groups, and wherein each server application in the plurality of server application server groups has one or more weights; wherein the policy is used to identify the set of server applications to perform the operations in the requests based on the set of common resources used by the set of server applications in combination with information comprising resource configuration information identifying resources that may be accessed by the server applications, resource availability information indicating resources that can actually be accessed by the server applications; and
   load information identifying a workload on different server applications including information comprising a number of requests each server application has to process and the policy is used to send the requests to the set of server applications accessing the set of common resources in which the requests are received during a session;

assigning the requests to the set of server applications identified; and adding the assignment of the requests to an assignment log.

2. The method of claim 1 further comprising:

sending, by the workload manager system, the requests assigned to the set of server applications identified for the requests.

3. The method of claim 1 further comprising:

sending, by a load balancer, the requests assigned to the set of server applications identified for the requests by the workload manager system.

4. The method of claim 1, wherein identifying, by the workload manager system, the set of server applications to perform the operations in the requests based on the set of common resources used by the set of server applications comprises:

identifying, by the workload manager system, a type of server application to perform an operation for a request in the requests; and identifying, by the workload manager system, a server application based on the type of server application identified to perform the operation in the request and a common resource on which the operation is performed.

5. The method of claim 1, wherein the set of common resources comprises at least one of a set of data sources, hardware, and a set of computer systems on which the set of server applications is located.

6. The method of claim 1, wherein the set of common resources is selected from one of hardware resources and data sources.

7. The method of claim 1, wherein the requests are for a website.

* * * * *